No. 750,468. PATENTED JAN. 26, 1904.
M. LEE.
TANK MOLD.
APPLICATION FILED JUNE 1, 1903.
NO MODEL.
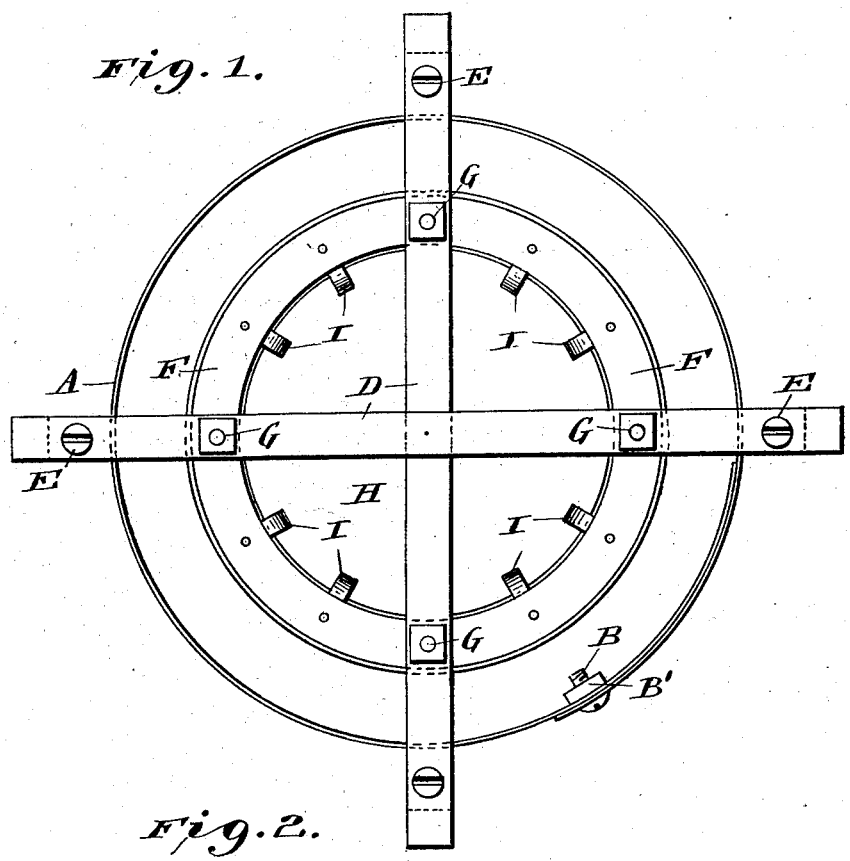
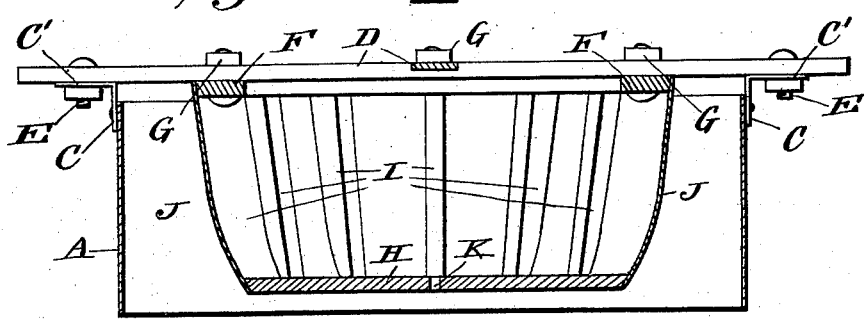
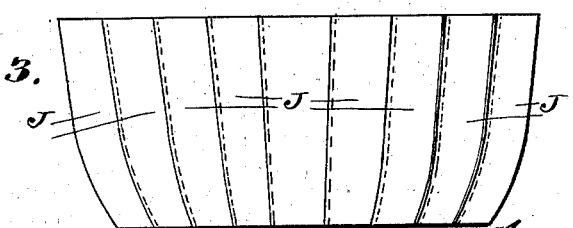

No. 750,468. Patented January 26, 1904.

UNITED STATES PATENT OFFICE.

MARION LEE, OF ANGOLA, INDIANA.

TANK-MOLD.

SPECIFICATION forming part of Letters Patent No. 750,468, dated January 26, 1904.

Application filed June 1, 1903. Serial No. 159,597. (No model.)

*To all whom it may concern:*

Be it known that I, MARION LEE, a citizen of the United States, residing at Angola, in the county of Steuben and State of Indiana, have invented certain new and useful Improvements in Tank-Molds, of which the following is a specification.

My invention relates to molds for making tanks of cement and other plastic substances, and has for its object to provide a mold of simple construction, easy to manipulate, and effective in operation.

The advantages of my invention will more fully appear hereinafter and by reference to the accompanying drawings, in which—

Figure 1 is a top plan view of my improved mold; Fig. 2, a view in vertical section, and Fig. 3 a side view of the core or inner part.

Referring to the drawings, in which similar reference characters indicate corresponding parts throughout the several views, A represents the casing to form the outer side of the wall, made, preferably, of sheet metal, having its overlapped ends fastened by means of screw-bolts B and nuts B'.

C represents brackets secured to casing A and having horizontal projections C', on which are adapted to rest cross-bars D and secured thereto by means of bolts and nuts E.

The core or inner part of the mold consists of a ring F, removably secured to cross-bars D by means of bolts and nuts G, a bottom plate H, vertical ribs I, secured to said ring and plate, and sheathing-plates J, said plates J being secured in any suitable manner on the outer side of ribs I and overlapped, as shown. It will be observed that the outer wall of the inner part is slightly inclined to permit its easy removal from the molded article, while the bottom plate H is provided with one or more holes K to prevent suction when the inner part is being removed. The crevices between the sheathing-plates J also perform the same function and form an escape for surplus water from the cement while being molded.

The operation of my invention will be understood to be as follows: The device being assembled, as shown in Figs. 1 and 2, plastic material—such as a mixture of cement, sand, and water or other suitable substances—is poured between the casing A and the inner part and packed down in any suitable manner. After the material has "set," but before it is thoroughly dry, the inner part is taken out by removing bolts and nuts E from cross-bars D and brackets C and then lifting by said cross-bars. The inside of the tank or molded article is then smoothed, if desired, with a trowel or other suitable implement to remove the ridges left by the overlapped plates J. The casing A is then removed by unscrewing the bolts B, the nuts B' picked out of the molded article, and the holes left thereby filled up with the composition forming the tank.

If it is desired to have holes left for inlet and exhaust pipes, it will be readily understood that this can be secured by making holes in the core and casing at the desired places and running bars or pipes therethrough before the plastic material is poured into the mold.

I have shown a mold for forming a circular tank; but it will be readily understood that tanks of other shapes — such as elliptical, square, oblong, &c.—may be formed by altering the molds accordingly.

Having thus described my invention, what I claim is—

1. In a tank-mold, the inner part having its outer wall formed of overlapping plates having crevices at their joints and having holes in its bottom, as and for the purpose described.

2. In a tank-mold, the inner part having its outer wall formed of overlapping plates with narrow crevices at their joints and having holes in its bottom, an outer casing, and means to support said inner part on the casing, substantially as shown and described.

3. In a tank-mold, an outer casing, and an inner part supported by said casing, said inner part being composed of overlapping plates having crevices between them, substantially as shown and described.

4. In a tank-mold, an outer casing, brackets on said casing, cross-bars secured to said brackets, and an inner part secured to said cross-bars having its outer surface made up of overlapping plates having crevices between them, substantially as shown and described.

5. In a tank-mold, an outer casing consisting of a continuous band of metal having its overlapping ends suitably secured, and an inner part supported by said casing having its outer surface composed of overlapping plates having crevices between them, substantially as shown and described.

6. In a tank-mold, an outer casing, brackets on said casing, cross-bars secured to said brackets and an inner part secured to said cross-bars consisting of a ring, a bottom plate, ribs connecting said ring and bottom plate, and overlapping sheathing-plates, substantially as shown and described.

7. In a tank-mold, an outer casing consisting of a continuous band of metal having its overlapping ends suitably secured, brackets secured to said band of metal, cross-bars removably secured to said brackets, and an inner part secured to said cross-bars, having its sides formed of overlapping plates with crevices between them, substantially as shown and described.

8. In a tank-mold, an outer casing consisting of a continuous band of metal having its overlapping ends suitably secured, brackets secured to said band of metal, cross-bars removably secured to said brackets, and an inner part secured to said cross-bars consisting of a ring, a bottom plate, ribs connecting said ring and bottom plate, and overlapping sheathing-plates, substantially as shown and described.

9. In a tank-mold, an outer casing consisting of a continuous band of metal having its overlapping ends secured by screw-bolts and nuts, brackets secured to said band of metal, cross-bars removably secured to said brackets by bolts and nuts, a ring secured to said cross-bars, vertical ribs secured to said ring and inclined inwardly, a bottom plate having holes therein secured to said ribs, and sheathing-plates secured to said ring, ribs, and bottom plate and overlapped to form crevices, substantially as shown and described.

10. In a tank-mold, an outer casing consisting of a continuous band of metal having its overlapping ends secured by screw-bolts and nuts, angular brackets secured to said band of metal, crossed bars removably secured to said brackets by bolts and nuts, a ring secured to said bars, vertical ribs secured to ring and inclined inwardly, a perforated bottom plate secured to the lower end of said ribs, and sheathing-plates secured to raid ring, ribs, and bottom plate and overlapped to form narrow crevices at their joints, substantially as shown and described.

In testimony whereof I hereto affix my signature in the presence of two witnesses.

MARION LEE.

Witnesses:
C. A. SHEETS,
J. A. SHAUGHNISS.